United States Patent
Infante-Lopez

(10) Patent No.: US 10,853,370 B2
(45) Date of Patent: Dec. 1, 2020

(54) DEVICES AND/OR METHODS TO PROVIDE A QUERY RESPONSE BASED ON EPHEMERAL DATA

(71) Applicant: Intel Corporation, Santa Clara, CA (US)

(72) Inventor: Gabriel G. Infante-Lopez, Cordoba (AR)

(73) Assignee: Intel Corporation, Santa Clara, CA (US)

( * ) Notice: Subject to any disclaimer, the term of this patent is extended or adjusted under 35 U.S.C. 154(b) by 1074 days.

(21) Appl. No.: 14/751,841

(22) Filed: Jun. 26, 2015

(65) Prior Publication Data

US 2016/0378831 A1    Dec. 29, 2016

(51) Int. Cl.
G06F 16/901    (2019.01)
G06F 16/2455    (2019.01)

(52) U.S. Cl.
CPC .... G06F 16/24553 (2019.01); G06F 16/9024 (2019.01)

(58) Field of Classification Search
CPC .............. G06F 17/30483; G06F 16/9024
See application file for complete search history.

(56) References Cited

U.S. PATENT DOCUMENTS

| 8,144,632 | B1 | 3/2012 | Chapweske et al. |
| 8,533,182 | B1 * | 9/2013 | Charboneau ...... G06F 16/90335 707/718 |
| 9,396,287 | B1 * | 7/2016 | Bhave ................. G06F 11/3476 |
| 2002/0178246 | A1 * | 11/2002 | Mayer ..................... H04L 41/12 709/223 |
| 2002/0194154 | A1 * | 12/2002 | Levy ....................... G16B 50/00 |
| 2010/0318537 | A1 | 12/2010 | Surendran et al. |
| 2012/0054175 | A1 * | 3/2012 | Barsness ........... G06F 17/30477 707/719 |

(Continued)

FOREIGN PATENT DOCUMENTS

WO    2008014062 A2    1/2008

OTHER PUBLICATIONS

International Search Report and Written Opinion for International Patent Application No. PCT/US2016/033788, dated Aug. 31, 2016, 11 pages.

(Continued)

*Primary Examiner* — Apu M Mofiz
*Assistant Examiner* — Dara J Glasser
(74) *Attorney, Agent, or Firm* — Jordan IP Law, LLC

(57) ABSTRACT

Systems, apparatuses and methods may provide a query response. A value of a time-to-live (TTL) for data associated with a computation unit may be determined, wherein the computation unit may disallow access to the data when the TTL is expired. Additionally, a determination may be made whether the data associated with the computation unit satisfies a query. Also, a query response may be generated including the data associated with the computation unit that satisfies the query. In one example, a context for the data associated with the computation unit may be determined, wherein the computation unit may disallow access to the data based on the context. Data may be represented as a network of computation units which may provide data with a TTL that is contextual, which may be handled in a massively distributed fashion.

25 Claims, 8 Drawing Sheets

(56) References Cited

U.S. PATENT DOCUMENTS

| | | | |
|---|---|---|---|
| 2012/0066249 A1* | 3/2012 | Hays | G06F 17/30433 707/769 |
| 2014/0040300 A1 | 2/2014 | Narayanan et al. | |
| 2014/0071135 A1* | 3/2014 | Morsi | G06Q 10/10 345/440 |
| 2015/0032726 A1 | 1/2015 | Barykin et al. | |
| 2015/0039597 A1* | 2/2015 | Raina | G06F 16/24539 707/723 |
| 2015/0370890 A1* | 12/2015 | Halan | G06F 17/30604 707/728 |

OTHER PUBLICATIONS

Infante-Lopez, Gabriel G., "Systems and Methods for Pattern Matching and Relationship Discovery", Pending U.S. Appl. No. 14/318,015, filed Jun. 27, 2014, 33 pages.

Danah Boyd, "Risk Reduction Strategies on Facebook", www.zephoria.org, Nov. 8, 2010, 2 pages.

Elastic, "Learn Docs: _ttl", Elasticsearch Reference(1.6), 2015, 3 pages.

Frankly Chat, "Frankly Chat—Free, Private Text Messaging App", App Store on iTunes, retrieved Jun. 26, 2015, 3 pages.

Mongodb, "Expire Data from Collections by Setting TTL", MongoDB Manual 3.0.4, retrieved Jun. 26, 2015, 3 pages.

MySQL, "8.4.4 Setting the TTL", MySQL PHP API, 2014, 3 pages.

Snapchat, "Snapchat", App Store on iTunes, retrieved Jun. 26, 2015, 3 pages.

Wickr, "Wickr Features", <www.wickr.com/wickr-features/>, retrieved Jun. 26, 2015, 2 pages.

International Preliminary Report on Patentability for International Patent Application No. PCT/US2016/033788, dated Jan. 4, 2018, 8 pages.

European Search Report for European Patent Application No. 16814926.8, dated Oct. 25, 2018, 8 pages.

Yin et al., "Supporting Cooperative Caching in Ad Hoc Networks", IEEE, Jan. 1, 2006, p. 77-89, vol. 5 No. 1.

Filali et al., "Dynamic TTL-Based Search in Unstructured Peer-to-Peer Networks", 10th IEE/ACM International Conference on Cluster, Cloud and Grid Computing, May 17, 2010, pp. 438-447.

* cited by examiner

DEVICES AND/OR METHODS TO PROVIDE A QUERY RESPONSE BASED ON EPHEMERAL DATA

TECHNICAL FIELD

Embodiments generally relate to providing a query response. More particularly, embodiments relate to devices and/or methods to provide a response to a query based on ephemeral data such as contextual ephemeral data.

BACKGROUND

Data may be modeled as a graph representing a number of entities as a set of vertices (e.g., people, objects, geographical locations, etc.). A graph also includes edges connecting at least some of the vertices, wherein the edges represent relationships between entities represented by the vertices. An edge may be assigned values (e.g., a value corresponding to driving distance, travel time, etc.) and/or a weight (e.g., a degree of friendship, a level of trust between people represented by connected vertices, etc.), further modeling the relationship between entities. In one example, a graph may represent a geographic region, wherein vertices represent cities or other locations in the region and an edge between two vertices represents physical connectivity between the locations (e.g., a fact that one can drive from one location to another). In another example, a graph may be used to model a social network, wherein each person is represented by a vertex and an edge between two vertices represents a relationship between the people (e.g., a friendship, a family relationship, a business relationship, etc.).

Graphs, however, are not utilized to model ephemeral data. Moreover, conventional architectures that handle data with expiration values may require components external to the architectures to handle the expired data (e.g., a daemon). Additionally, expiration values may depend only on the data itself. In addition, access to the data may depend only on the expiration values. Also, complexity may grow exponentially when it is required to utilize data being respectful of expiration values. Thus, there may be an inefficient use of computer resources (e.g., dedicated processors).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
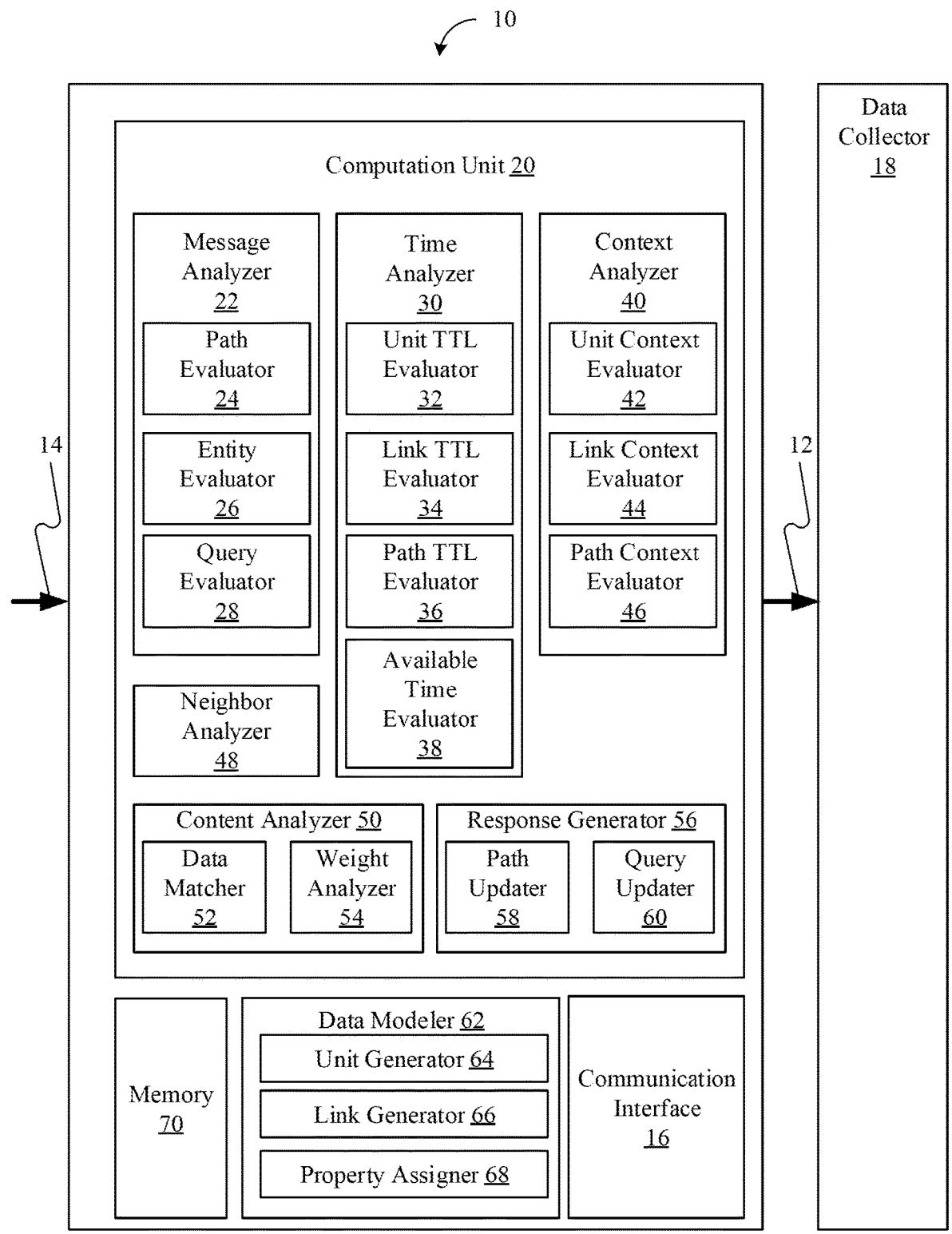
FIG. 1 is a block diagram of an example of an apparatus to provide a response to a request according to an embodiment.

FIG. 1 illustrates an apparatus 10 that may include a computing platform such as, for example, a desktop computer, a notebook computer, a tablet computer, a convertible tablet, a personal digital assistant (PDA), a mobile Internet device (MID), a media player, a smart phone, a smart televisions (TV), a radio, an infotainment system, a wearable device, a gaming platform, a server platform, and so on. The apparatus 10 may provide a response 12 including data that satisfies a request 14. The request 14 may include, for example, a message having a path (e.g., of a graph) already collected, an entity identifier (e.g., of a user, of an organization, etc.), a query identifier (e.g., a plurality of queries may be flowing in a graph at a given time), and/or a query (e.g., a regular expression, an updated/modified/new regular expression, etc.).

In the illustrated example, the apparatus 10 includes a communication interface 16 that may provide the response 12 to a data collector 18. The data collector 18 may be internal to the apparatus 10 or external to the apparatus 10 (as shown), may include physical or virtual resources (e.g., memory, storage, etc.), and so on. Thus, the message of the request 14 may also include a collector address for the collector 18 such as, for example, a bus address, a virtual memory address, a physical memory address, a media access control (MAC) address, an internet protocol (IP) address, and so on.

The illustrated apparatus 10 further includes a computation unit 20 that may host data satisfying the request 14. In one example, there may be a plurality of computation units that host respective data, wherein the plurality of computation units may be distributed in more than one apparatus. Moreover, any or all components of the computation unit 20 may execute as logic (e.g., logic instructions, configurable logic, fixed-functionality logic hardware, etc., or any combination thereof). In the illustrated example, the computation unit 20 includes a message analyzer 22 that may evaluate the message of the request 14, which further includes a path evaluator 24 that may determine a path already collected by the message prior to arriving at the computation unit 20, an entity evaluator 26 that may determine an entity identifier for an entity issuing a query, and a query evaluator 28 that may determine a query identifier and/or a query (e.g., a regular expression).

The illustrated computation unit 20 further includes a time analyzer 30 that may determine a value of a time-to-live (TTL) for data associated with the computation unit 20, wherein the computation unit 20 may disallow access to data satisfying the query when the TTL is expired. A determination of a TTL value for data associated with the computation unit 20 may include, for example, identifying an explicitly assigned TTL value for the data and/or identifying an intrinsic TTL value for the data. In the illustrated example, the time analyzer 30 includes a unit TTL evaluator 32 that may determine a value of a unit TTL for data represented by the computation unit 20, wherein the computation unit 20 may remove the data represented by the computation unit 20 when the unit TTL is expired.

In addition, the time analyzer 30 includes a link TTL evaluator 34 that may determine a value of a link TTL for data represented by a link joining the computation unit 20 and a neighbor computation unit (e.g., a next computation unit in a path), wherein the computation unit 20 may remove the data represented by the link when the link TTL is expired. The time analyzer 30 further includes a path TTL evaluator 36 that may determine a value of a path TTL for data represented by all computation units and/or all links joining all computation units in a particular path, wherein the computation unit 20 may remove the data represented by the particular path when the path TTL is expired. In one example, the value of the path TTL may be an overall value (e.g., cumulative, additive, averaged, mean, etc.) of the particular path. In another example, the value of the path TTL may be a partial value of a part of the particular path (e.g., smallest TTL of the members of the path, etc.).

The time analyzer 30 also includes an available time evaluator 38 that may determine whether there is time available for the computation unit 20 to process a query, and/or whether there is time available for a message (e.g., an updated message, an updated query, etc.) to arrive at a neighbor computation unit. In one example, the computation unit 30 may disallow access to the data associated with the computation unit 20 when there is not enough time for a message to arrive at a neighbor computation unit.

The illustrated computation unit 20 further includes a context analyzer 40 that may determine whether to allow access to the data associated with the computation unit 20 based on a context for the data. The context may include, for example, a manner in which the data is to be used, an entity that is to request the data, a computation unit involved (e.g., to be traversed, traversed, etc.) to obtain data for the response 12, a link involved (e.g., to be traversed, traversed, etc.) to obtain data for the response 12, and so on. The context may be utilized to assign and/or to evaluate a TTL for data associated with the computation unit 20.

In the illustrated example, the context analyzer 40 includes a unit context evaluator 42 that may determine a context for data represented by the computation unit 20. For example, the unit context evaluator 42 may determine a context for data represented by the computation unit 20 based a manner data represented by the computation unit 20 is to be used, an entity that is to request the data represented by the computation unit 20, a computation unit to be traversed or traversed to obtain data for the response 12, and so on. The context analyzer 40 further includes a link context evaluator 44 that may determine a context for data represented by a link joining the computation unit 20 with a neighbor computation unit based on, for example, a manner data represented by the link is to be used, an entity that is to request the data represented by the link, a link to be traversed or traversed to obtain data for the response 12, and so on.

The illustrated context analyzer 40 also includes a path context evaluator 46 that may determine a context for data represented by all computation units in a particular path and/or data represented by all links joining all computation units in the particular path (e.g., end-to-end path, segment thereof, etc.). The computation unit 20 may remove data based on the context for the data (e.g., if the context for the data does not permit access to the data).

The illustrated computation unit 20 further includes a neighbor analyzer 48 that may determine whether a neighbor computation unit provides data for the response 12. For example, the computation unit 20 may disallow access to a link joining the computation unit 20 with the neighbor computation unit (e.g., in a particular path) when the neighbor computation unit provides data (e.g., when a query has visited the neighbor computation unit).

The illustrated computation unit 20 further includes a content analyzer 50 that may determine whether data represented by the computation unit 20 and/or data represented by a link joining the computation unit 20 with a neighbor computation unit satisfies the request 14 (e.g., satisfies a query). In one example, the content analyzer 50 may determine whether data satisfies a query when the query is received. In another example, the content analyzer 50 may determine whether data satisfies a query when the computation unit 20 determines that access is allowed to the query.

In the illustrated example, the content analyzer 50 includes a data matcher 52 that may determine whether data associated with the computation unit at least partially matches the request 14. For example, the data matcher 48 may determine whether data represented by the computation unit 20 and/or data represented by a link joining the computation unit 20 with a neighbor computation unit at least partially satisfies a query. In one example, a query may include a regular expression and the computation unit 20 may determine whether data represented by the computation unit 20 and/or data represented by a link emanating from the computation unit 20 includes a value that at least partially satisfies the regular expression.

The illustrated content analyzer 50 further includes a weight analyzer 54 that may determine whether a weight for data associated with the computation unit 20 is sufficient to satisfy the request 14. In one example, the weight analyzer 54 may determine a weight value for data represented by the computation unit 20 and/or data represented by a link joining the computation unit 20 with a neighbor computation unit. Thus, the computation unit 20 may disallow access to data associated with computation unit 20 based on an insufficient weight of the data relative to a threshold value (e.g., quantitative threshold value, qualitative threshold value, etc.).

An overall weight (e.g., cumulative, additive, averaged, mean, etc.) of a particular path may be utilized to determine whether to allow access to data (e.g., all data) from the particular path. A partial weight (e.g., partially cumulative, etc.) of a portion of a particular path may also be utilized to determine whether to allow access to data (e.g., all data) from the particular path. A weight may be quantitative (e.g., numerical value against a numerical scale, etc.), qualitative (e.g., trustworthy or untrustworthy against a trustworthy scale, etc.), and so on.

The illustrated computation unit 20 further includes a response generator 56 that may generate the response 12 including the data associated with the computation unit 20 that satisfies the request 14. In the illustrated example, the response generator 56 includes a path updater 58 that may generate an updated (e.g., modified, new, etc.) path relative to the path received in the message of the request 14. The updated path may include, for example, the data already matched to the query in the message of the request 14 received at the computation unit 20 together with the data provided by the computation unit 20.

The illustrated response generator 56 further includes a query updater 60 that may generate an updated (e.g., modified, new, etc.) query relative to the query received in the message of the request 14. The updated query may include, for example, a value of the query that has been satisfied and/or that is yet to be satisfied. Thus, the query updater 60 may generate an updated query indicating a value that satisfies the query and that includes a remaining value of the query received at the computation unit 20 yet to be satisfied. A neighbor computation unit may use the updated path and/or the updated query (e.g., via an updated message) to process the request 14. When the query has ended, the updated path and/or the updated query may be included in the response 12 as the data satisfying the request 14 that is forwarded to the data collector 18.

The illustrated apparatus 10 further includes a data modeler 62 that may represent a knowledge base as a graph including a link joining two or more computation units. For example, the data modeler 62 may organize a plurality of computation units wherein the knowledge is defined by the data content of the computation units and the links between the units. Moreover, the computation units may compute independently. In the illustrated example, the data modeler 62 includes a computation unit generator 64 that may generate a computation unit, such as the computation unit 20, a link generator 66 that may generate a link, such as a link between the computation unit 20 and a neighbor computation unit, and a property assigner 68 that may assign a property to a component of the graph (e.g., a computation unit, a link, etc.).

The property assigner 68 may specify, for example, a TTL value (e.g., a unit TTL, a link TTL, a path TTL, etc.), a context (e.g., via a security policy, a usage policy, a condition policy, etc.), a weight, and so on. In one example, a property (e.g., a TTL value) may be assigned based on a type of a source of data and/or a type of data (e.g., a sensor and/or sensor data in an Internet-of-Things computer network). In another example, a property may be assigned automatically and/or in response to user input (e.g., input from a source of data, from an owner of data, from a managing entity, etc.).

In the illustrated example, the apparatus 10 further includes memory 70 to store a data structure (e.g., a table) that may provide a correspondence between a computation unit, a link, a path, data, a weight, a context (e.g., via a security policy, a usage policy, a condition policy, etc.), and/or a TTL value. The correspondence may be a 1:1 correspondence, such as when the computation unit 20 represents one piece of data (e.g., one person), when one piece of data is assigned one TTL value, and so on. The correspondence may be a m:n correspondence, wherein m and/or n have a value≥one.

Additionally, the memory 70 may store a graph (or a portion thereof) in an address space, which may be retrieved to provide both the response 12 based on ephemeral data (e.g., contextual ephemeral data) and efficient handling of the ephemeral data. In one example, a machine executable file may load one part of a graph and a different machine executable file may load a different part of the graph, sequentially or in parallel, as a message flows into or through a graph.

In addition, the memory 70 may store a library that supports message passing and/or concurrent execution of computation units for fault tolerance, scalability, and/or to control relatively large volumes of data. For example, the computation unit 20 may be retrieved from a library and implemented by a hardware processor of the apparatus 10 in a particular graph to compute as a component of the particular graph. In this regard, the computation unit 20 may compute in, and/or may be a component of, one particular graph at a given time, wherein the particular graph may be partitioned to run locally in same or different physical or virtual machines (e.g., JAVA virtual machines). Thus, for example, computation units that represent data may reside in a library and may be ordered into a graph using a knowledge base, wherein the graph may be stored centrally external to the apparatus 10 (e.g., at memory, at a hard drive, etc.) and partitioned to be executed locally.

The components of the apparatus 10 may be arranged in any configuration, on the same or different physical or virtual machines. In one example, the data modeler 62 or portion thereof such as the property assigner 68 may be located physically external to the apparatus 10 and accessible via the communication interface 16 (e.g., a network interface card) over a computer network. In this regard, a graph or portion thereof may be stored physically external to the memory 70 (e.g., at a hard drive), which storage may be physically local to the apparatus 10 and/or physically external to the apparatus 10. In another example, the data collector 18 may be located physically internal to the apparatus 10 as a physical memory address space of the memory 70. In a further example, one or more components of the computation unit 20 may be combined into a single component or separated into individual components, which may reside physically external to the apparatus 10 and/or to the computation unit 20.

Figure 2:
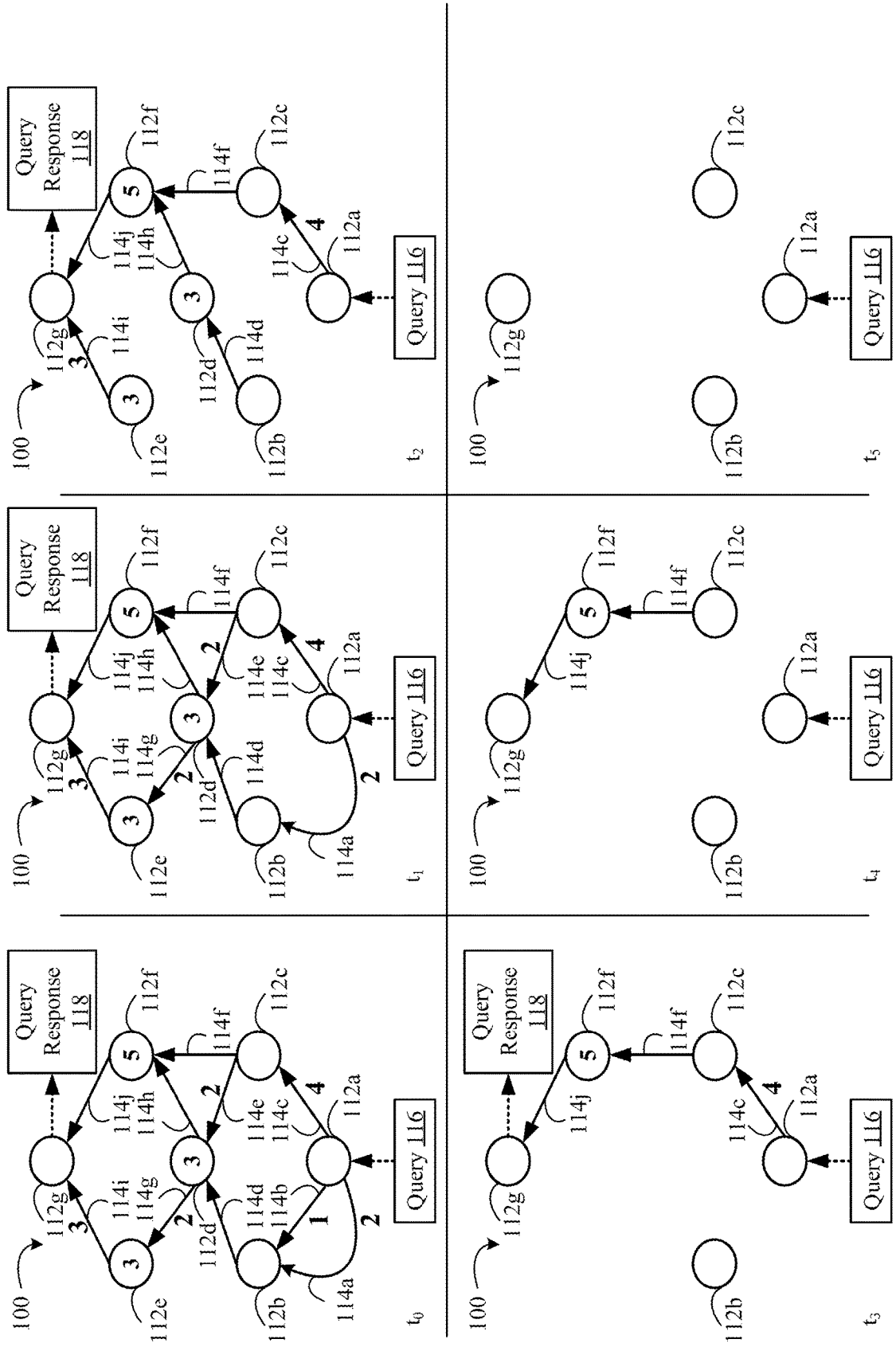
FIG. 2 is a diagram of an example of a graph including a computation unit to provide a query response based on ephemeral data according to an embodiment.

Turning now to FIG. 2, a graph 100 is shown in which a plurality of computation units 112 (112a-112g) are joined via a plurality of links 114 (114a-114j), wherein the graph 100 may be traversed by a query 116 to provide data satisfying the query 116 in a query response 118. Any or all of the computation units 112 may execute as logic (e.g., logic instructions, configurable logic, fixed-functionality logic hardware, etc., or any combination thereof). The graph 100 may codify (e.g., model) a knowledge base, representing entities (e.g., people, objects, geographic locations, etc.) by the computation units 112 joined via relationships represented by the links 114. Notably, the graph 100 changes as time passes from a time interval $t_0$ to a time interval $t_5$, providing different paths through the graph 100 and therefore providing different data satisfying the query 116 based on ephemeral data.

At the time interval $t_0$, for example, the query 116 arrives at the computation unit 112a, which may determine a value of a time-to-live (TTL) for data associated with the computation unit 112a. In this regard, the computation unit 112a may only have access to data corresponding to the computation unit 112a and to data corresponding to outgoing links 114a-114c, which provides scalability since a central server does not need to be contacted to understand all the data within a graph but instead provides a decentralized architecture to handle ephemeral data. Thus, access to data associated with the computation unit 112a may be from local memory (and/or storage) rather than a central server having all data represented by a graph. In one example, data associated with the computation unit 112a may be stored at a data address space for data represented by the computation unit 112a and at a data address space for data represented by the links 114a-114c that is accessible and loaded by the computation unit 112a (e.g., from local memory).

The computation unit 112a may determine a value of a unit TTL for data represented by the computation unit 112a (e.g., a user in a social graph, a city in geographic graph, a sensor in an Internet-of-Things graph, etc.), and may disallow access to the data represented by the computation unit 112a when the unit TTL is expired. The computation unit 112a may disallow access to the data by, for example, removing the data from the graph 100 (e.g., deleting itself from a graph, blocking access to itself by a query, making itself transparent to a query, etc.). In this regard, removal of data by the computation unit 112a may be local to the computation unit 112a since the computation unit 112a may remove data associated with the computation unit 112a in local memory (and/or local storage) associated with the computation unit 112a and may not need to communicate with a central server to modify a graph.

In the illustrated example, the computation unit 112a determines there is no unit TTL or a value of the unit TTL is infinity for the data represented by the computation unit 112a, and therefore that the data represented by the computation unit 112a is not expired and/or that the computation unit 112a is not expired. In this regard, the computation unit 112a may forward a message via outgoing links that are in a path satisfying the query 116. In one example, the computation unit 112a may write a message to a mailbox address space associated with outgoing links in a path satisfying the query 116 that is accessible by a neighbor computation unit connected to the outgoing links when the data associated with the computation unit 112a satisfies the query 116.

In parallel and/or in sequence, the computation units 112b-112g may evaluate respective unit TTL's for data associated with respective computation units 112b-112g. For example, the computation unit 112e may determine a time value (3) of a unit TTL for data represented by the computation unit 112e while the computation unit 112f determines a time value (5) of a unit TTL for data represented by the computation unit 112f, and therefore that data represented by the computation units 112e, 112f is not expired and/or that the computation units 112e, 112f are not expired.

The computation unit 112a may also determine a value of a link TTL for data represented by a link (e.g., friendship in a social graph, a road in geographic graph, etc.) joining the computation unit 112a and neighbor computation units 112b, 112c, and may disallow access to the data represented by the link when the link TTL is expired. For example, the computation unit 112a may disallow access to the data by removing the data from the graph 100 (e.g., deleting an expired link from a graph, blocking access to an expired link by a query, making an expired link transparent to a query, etc.). As discussed above, removal of data by the computation unit 112a may be local to the computation unit 112a.

In the illustrated example, the computation unit 112a determines a time value (2) of a link TTL for data represented by the link 114a, a time value (1) of a link TTL for data represented by the link 114b, and a time value (4) of a link TTL for data represented by the link 114c. Thus, the computation unit 112a determines that data represented by the links 114a-114c is not expired and/or that the links 114a-114c are not expired. In this regard, the computation unit 112a may write a message to a mailbox address space associated with outgoing links in a path satisfying the query 116 that is accessible by a neighbor computation unit connected to the outgoing links when the data associated with the computation unit 112a satisfies the query 116.

In parallel and/or in sequence, the computation units 112b-112f may evaluate respective link TTL's for data associated with respective links 114d-114j. For example, the computation unit 112d may determine a time value (2) of a link TTL for data represented by the link 114g and an absence of a link TTL for data represented by the link 114h, and therefore that data represented by the links 114g, 114h is not expired and/or that the links 114g, 114h are not expired at the time interval $t_0$. Similar to the computation unit 112a, the computation units 112b-112g may only have access to respective associated data and respective outgoing links, and may remove data locally (e.g., remove data in respective local physical or virtual memory) and forward messages.

Notably, any or all of the computation units 112 may compute independently to provide a decentralized architecture for both query processing and handling of ephemeral data (e.g., data with a defined expiration data). For example, each of the computation units 112a-112g may independently determine whether data associated with respective computation units 112a-112g is both unexpired and satisfies the query 116.

The query 116 may be a query that searches for a path between the vertices 112a, 112g. In one example, the query 116 may include a request such as "recommend all light comedies to me that my friends like staring actress Z", and the computation unit 112a may determine whether data represented by the computation unit 112a (e.g., "person", "self", etc.) and/or data represented by the link 114a (e.g., "colleague") and the links 114b, 114c (e.g., "friend") at least partly satisfy the query 116 while being respectful of expiration dates placed on the data (e.g., assigned by a source or owner of data, etc.). Thus, for example, the computation unit 112a may access local memory to load data associated with the computation unit 112a and processes the data to determine if the data satisfies the query 116.

In this case, the computation unit 112a may determine that data represented by the computation unit 112a does satisfy "my" of the query 116 based on the data (e.g., "person", "self", etc.) and that the data has not expired at the time interval $t_0$ based on the absence of a unit TTL value for the data. The computation unit 112a may also determine that data represented by the links 114b, 114c does satisfy "friends" of the query 116 based on the data (e.g., "friend") and that the data has not expired at the time interval $t_0$ based on the value (2) of the unit TTL for the data represented by the link 114b and the value (4) of the link TTL for the data represented by the link 114c. In addition, the computation unit 112a may send a message accessible to the computation units 112b, 112c via the links 114b, 114c since the data satisfies the query 116 by, for example, storing data at a mailbox address space of the link 114a that is accessible by the computation unit 112b and storing data at a mailbox address space of the link 114c that is accessible by the computation unit 112c.

Additionally, the computation unit 112b may determine whether data represented by the computation unit 112b (e.g., "person") and/or data represented by the link 114d (e.g., "likes") at least partly satisfies the query 116 while being respectful of expiration dates placed on the data. The computation unit 112c may also determine whether data represented by the computation unit 112c (e.g., "person") and/or data represented by the links 114e, 114f (e.g., "likes") at least partly satisfies the query 116 while being respectful of expiration dates placed on the data. Moreover, the computation unit 112d may determine whether data represented by the computation unit 112d (e.g., "movie") and/or data represented by the links 114g, 114h (e.g., "is a") at least partly satisfies the query 116 while being respectful of expiration dates placed on the data.

In addition, the computation unit 112e may determine whether data represented by the computation unit 112e (e.g., "dark comedy X") and/or data represented by the link 114i (e.g., "starring") at least partly satisfies the query 116 while being respectful of expiration dates placed on the data. Similarly, the computation unit 112f may determine whether data represented by the computation unit 112f (e.g., "light comedy Y") and/or data represented by the link 114j (e.g., "starring") at least partly satisfies the query 116 while being respectful of expiration dates placed on the data. The query 116 ends at the computation unit 112g, which may determine whether data represented by the computation unit 112g (e.g., "actress Z") at least partly satisfies the query 116 while being respectful of expiration dates placed on the data.

Accordingly, several paths across the graph 100 provide data satisfying the query 116 at the time interval $t_0$. A first path, for example, may include the link 114b joining the computation units 112a, 112b, the link 114d joining the computation units 112b, 112d, the link 114h joining the computation units 112d, 112f, and the link 114j joining the computation units 112f, 112g. Similarly, a second path may include the link 114c joining the computation units 112a, 112c, the link 114f joining the computation units 112c, 112f, and the link 114j joining computation units 112f, 112g. No path includes the computation unit 112e, and therefore also excludes the links 114g, 114i.

As illustrated in FIG. 2, one or more TTL's expire as time progresses from the time interval $t_0$ to the time interval $t_5$, which reduces a number of paths and/or data satisfying the query 116. For example, the first path is unavailable at the time interval $t_1$ since the link TTL for the link 114b expires and the computation unit 112a deletes the link 114b, leaving only the second path available as data satisfying the query 116. Thus, for example, knowledge that a person represented by the computation unit 114a likes light comedy X is no longer available through the particular path at the time interval $t_1$. At the time interval $t_4$, no path satisfies the query 116 since the link TTL for the link 114c also expires and the computation unit 112a deletes the link 114c.

Additionally, any or all of the computation units 112 may determine whether a next computation unit provides data for the query response 118 (e.g., visited by a query), and disallow access to a link joining it with a neighbor computation unit when the neighbor computation unit has provided data. For example, the computation unit 112d may determine, at the time interval $t_0$, that the computation unit 112f has provided data and disallow access to the link 114h (e.g., via the first path) to minimize loops. In this regard, the computation unit 112d may check a mailbox address space of the link 114h that is accessible by the computation unit 112f to confirm whether data has been written to the mailbox address space. In another example, all paths may be traversed by a query and duplicate data or redundant data may be deleted at a later time.

In addition, any or all of the computation units 112 may determine whether there is time available to process the query 116 (e.g., determine if data satisfies a query, determine or apply a weight to data, determine a TTL value, determine a context for data, modify a query, etc.), and/or whether there is time available for the query 116 to arrive at a neighbor computation unit. For example, the computation unit 112a may determine whether there is time available for the computation unit 112a to evaluate whether the data represented by the computation unit 112a satisfies the query 116, and/or whether there is time available for the query 116 to arrive at the computation units 112b, 112c. A determination of available time may be based on any factor including, for example, a time that a query is dispatched to a computation unit, a time that a query is received at a computation unit, a time to process a query at a computation unit, a time to modify a query at a computation unit, parallel processing, sequential processing, time remaining in a time interval, time to provide a query response, and so on.

Any or all of the computation units 112 may also determine whether to allow access to respective data based on a context for data. For example, the computation unit 112d may determine whether data represented by the computation unit 112d (e.g., "movie") and/or data represented by the links 114g, 114h (e.g., "is a") at least partly satisfies the query 116 while being respectful of expiration dates placed on the data and while being respectful of contextual properties placed on the data (e.g., via a usage policy, a security policy, a condition policy, etc.). Thus, the query response 118 may be based on contextual ephemeral data, rather than solely on a TTL.

Additionally, any or all of the computation units 112 may determine a weight value for data associated with respective computation units 112. For example, the computation unit 112d may determine whether a weight value for data represented by the computation unit 112d (e.g., "movie") and/or data represented by the links 114g, 114h (e.g., "is a") is sufficient to be used to satisfy the query 116 while being respectful of expiration dates placed on the data and/or contextual properties placed on the data. Thus, for example, an entity (e.g., a user of data, a manager of data, etc.) may place a weight value on data represented by the computation unit 112d and/or data represented by the links 114g, 114h to indicate a trustworthiness level of the data, wherein the computation unit 112d may evaluate the weight value to determine whether to allow access to the data.

In addition, any or all of the computation units 112 may generate an updated (e.g., modified, new, etc.) message including data that satisfies the query 116. The updated message may include, for example, an updated path relative to a path received, wherein the updated path may include data already matched to the query 116 together with data currently added that satisfies the query 116. For example, the computation unit 112b may generate an updated message at the time interval $t_0$ that includes an updated path relative to a path received at the computation unit 112b, wherein the updated path includes data represented by the computation unit 112b and/or data represented by the link 114d that is added to the path received at the computation unit 112d.

Moreover, an updated message may include an updated query relative to a query received, wherein the updated query may include a value of the query 116 that has been satisfied and/or that is yet to be satisfied. Thus, for example, the computation unit 112b may generate an updated query relative to a query received at the computation unit 112b, wherein the updated query may include a modified value that indicates the modified value at least partially satisfies the query and that includes a remaining value of the query received at the computation unit 112b that is yet to be satisfied. In one example, the query 116 may stop and data may be forwarded to a data collector when the entire query has been satisfied. In another example, the query may proceed even when data satisfying the entire query has been satisfied along a particular path since more and/or different data may be provided in response to the query 116.

Figure 3:
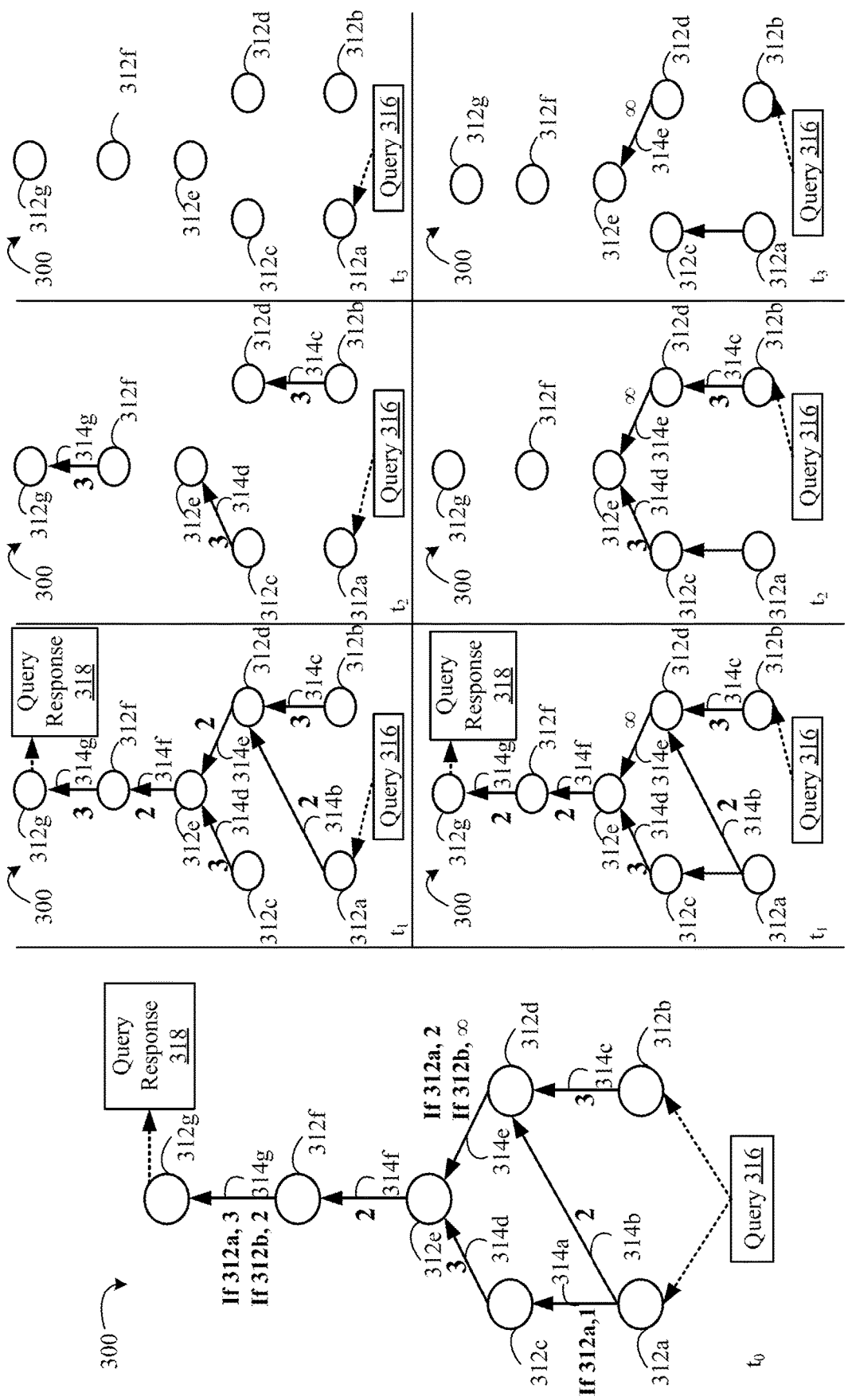
FIG. 3 is a diagram of an example of a graph including a computation unit to provide a query response based on contextual ephemeral data according to an embodiment.

FIG. 3 illustrates a graph 300 in which a plurality of computation units 312 (312a-312g) are joined via a plurality of links 314 (314a-314g), wherein the graph 300 may be traversed by a query 316 to provide data satisfying the query 316 in a query response 318. Any or all of the computation units 314 may execute as logic (e.g., logic instructions, configurable logic, fixed-functionality logic hardware, etc., or any combination thereof). The graph 300 may codify (e.g., model) a knowledge base, representing entities (e.g., people, objects, geographic locations, etc.) by the computation units 312 joined via relationships represented by the links 314. Notably, the graph 300 changes as time passes from a time interval $t_0$ to a time interval $t_5$, providing different paths through the graph 300 and therefore providing different data satisfying the query 316 based on a context.

As illustrated in FIG. 3, a condition policy may be assigned and/or evaluated for any or all of the components of the graph 300 to provide a context for data. For example, a condition rule may specify a unit TTL value and/or a link TTL value based the presence or absence of a particular computation unit and/or of a particular link in a particular path. In the illustrated example, the computation unit 312a may receive the query 316 and determine a value (1) of a TTL for data associated with the computation unit 312a based on a condition rule that specifies the value is to be (1) for the link 314a when the computation unit 312a is in the path.

Additionally, the computation unit 312d may determine a value (2) of a TTL for data represented by the link 314e based on a condition rule that specifies the value is to be (2) for the link 314e when the computation unit 312a is in the path, or that the value is to be infinity for the link 314e when the computation unit 312b is in the path. In addition, the computation unit 312f may determine a value (3) of a TTL for data represented by the link 314g based on a condition rule that specifies the value is to be (3) for the link 314g when the computation unit 312a is in the path, or that the value is to be (2) for the link 314g when the computation unit 312b is in the path.

A condition rule may also specify that any or all of the components of the graph 300 are not to be accessed and/or traversed based on the presence or absence of a particular computation unit and/or of a particular link in a particular path. The computation unit 312e may, for example, disallow access to itself when the link 314a is in the path (e.g., based on information a query has collected). Thus, any or all of the computation units 312 may disallow access to data based on a condition rule by, for example, removing data from the graph 300 when a condition is satisfied.

A usage policy may also be assigned and/or evaluated for any or all of the components of the graph 300 to provide a context for data. A usage rule may specify, for example, a TTL for any or all of the computation units 312 and/or for any or all of the links 314 based on a manner in which data is to be used (e.g., private use, public use, mining, cross-referencing with other data, etc.). Moreover, any or all of the computation units 312 may disallow access to data based on a usage rule by, for example, removing data from the graph 300 when usage is impermissible.

A security policy may further be assigned and/or evaluated for any or all of the components of the graph 300 to provide a context for data. A security rule may specify, for example, a TTL for any or all of the computation units 312 and/or for any or all of the links 314 based on an entity requesting data (e.g., organization, authorized user, etc.). Moreover, any or all of the computation units 312 may disallow access to data based on a security rule by, for example, removing the data from the graph 300 when security may be compromised.

Accordingly, several paths across the graph 300 may provide data satisfying the query 316 at the time interval $t_0$. As time passes, data available for satisfying the query 316 is reduced due to the contextual properties placed on the ephemeral data. As illustrated in FIG. 3, no path is available to provide data to satisfy the query 316 at the time interval $t_2$, whether or not the query 316 arrives at the computation unit 312a (top) or the query 316 arrives at the computation unit 312b (bottom).

Figure 4:
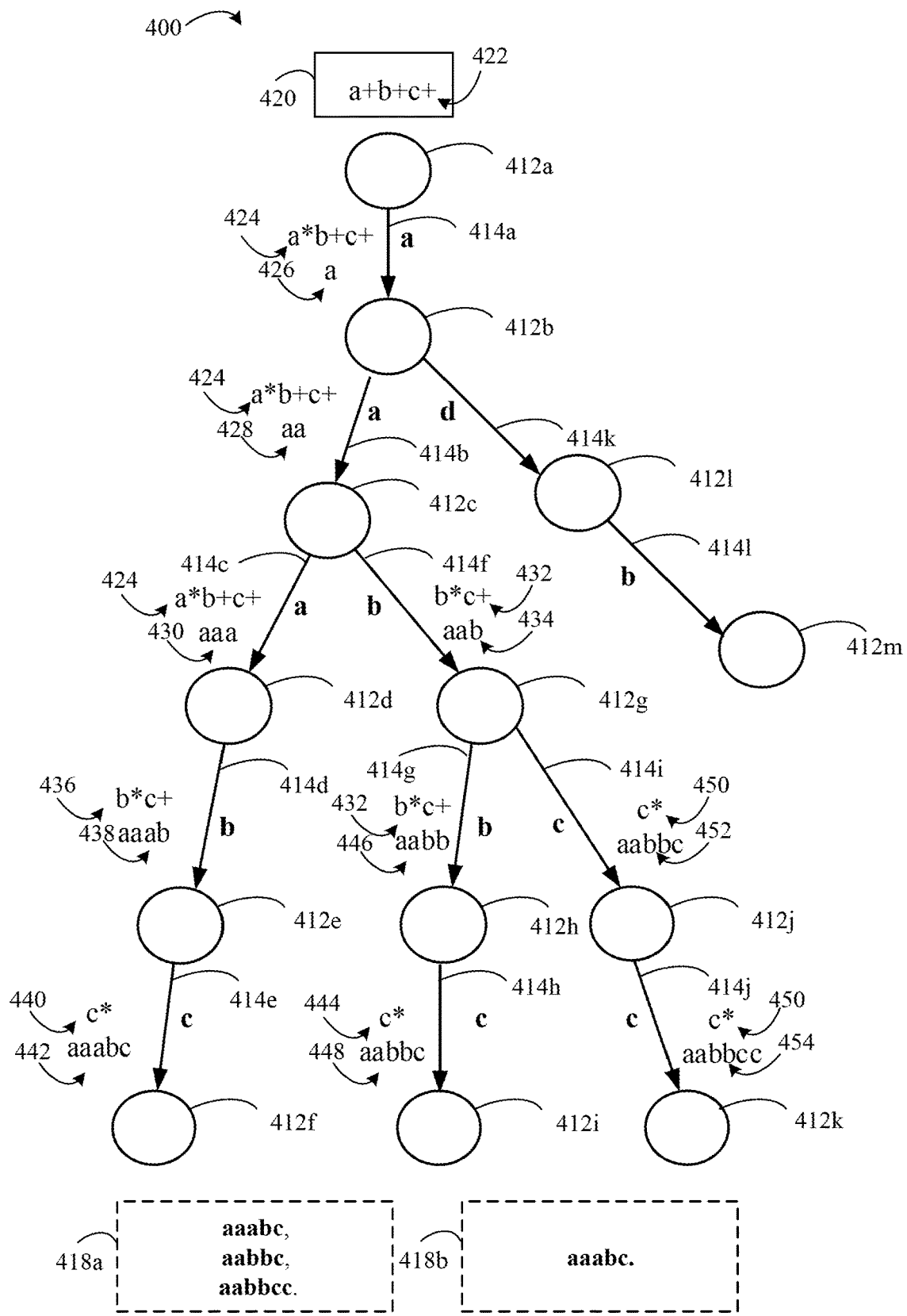
FIG. 4 is a diagram of an example of a graph including a computation unit to provide a query response in reply to a regular expression based on ephemeral data according to an embodiment.

Turning now to FIG. 4, a graph 400 is shown in which plurality of computation units 412 (e.g., vertices 412a-412m) are joined via a plurality of links 414 (e.g., edges 414a-414l) to provide a query response 418 (418a, 418b) in reply to a message 420. Any or all of the computation units 412 may execute as logic (e.g., logic instructions, configurable logic, fixed-functionality logic hardware, etc., or any combination thereof). As discussed below, the query response 418 may change based on when the message 420 is issued, a TTL, a context, a weight, time available, and so on.

In the illustrated example, the message 420 includes an initial regular expression 422 ($a+b+c+$) that indicates a path is sought, wherein the path sought may include one or more consecutive edges that each have value (a), followed by one or more consecutive edges that each have value (b), followed by an edge having value (c). The superscript "+" on a value (a) indicates, for example, that a next one or more edge in a path needs to have a value of (a) in order for the initial regular expression 420 to be satisfied.

The vertex 412a may evaluate edges emanating from it, to find one that satisfies a first subordinate condition of the initial regular expression 422 ($a+b+c+$). In this case, only the edge 414a emanates from the computation unit 412a, and it has a value (a). The edge 414a therefore satisfies the first subordinate condition of the initial regular expression 422 ($a+b+c+$). At this point, any path that will ultimately satisfy the initial regular expression 422 ($a+b+c+$) needs to have, from this point forward, zero or more consecutive edges each with value (a), followed by one or more consecutive edges each with value (b), followed by one or more consecutive edges each with value (c).

Vertex 412a may modify the initial regular expression 422 ($a+b+c+$) to become regular expression 424 ($a*b+c+$), wherein the superscript "*" indicates that zero or more consecutive edges having value (a) are required next for the eventual path to satisfy the initial regular expression 422 ($a+b+c+$). The regular expression 424 ($a*b+c+$) may be communicated from the vertex 412a to a vertex connected with the identified edge (e.g., satisfying the first subordinate condition), such as the vertex 412b connected with the edge 414a. In the illustrated example, a sequence including value (a) is also communicated to the vertex 412b to indicate that value (a) has already been matched to the initial regular expression 422 ($a+b+c+$) (e.g., path already collected includes (a)).

The regular expression 424 ($a*b+c+$) and/or path 426 (a) may therefore serve as input to the vertex 412b, which may perform processing similar to that of the vertex 412a. The vertex 412b may evaluate the edges emanating from it, to find one that satisfies the received regular expression 424 ($a*b+c+$). In this case, the two edges coming from the vertex 412b are the edge 414b having value (a) and the edge 414k having value (d). The regular expression 424 ($a*b+c+$) requires an edge that satisfies the condition of zero or more consecutive edges at the start, each having value (a) followed by one or more consecutive edges each having value (b). In the illustrated example, only the edge 414b emanating from the vertex 412b satisfies this condition. The edge 414k having the value (d) does not satisfy this condition, and may be ignored.

At this point, any path that will ultimately satisfy the initial regular expression 422 ($a+b+c+$) needs to have, from this point forward, zero or more consecutive edges each having value (a), followed by one or more consecutive edges that each have value (b), followed by an edge having value (c). The vertex 412b may modify the received regular expression 424 ($a*b+c+$) if necessary. In the illustrated example, modification is not necessary and is not performed; the requirement, from this point forward, remains ($a*b+c+$). In addition, the vertex 412b may modify the path 426 (a) to indicate that value (a) has been twice matched (e.g., path already collected includes (aa)). The regular expression 424 ($a*b+c+$) and path 428 (aa) are communicated to the next vertex, the vertex 412c, connected to the last identified edge that satisfies the message 420.

The vertex 412c may evaluate the edges emanating from it, to find one that satisfies the received regular expression 424 (a+b+c+). In this case, the two edges that emanate from the vertex 412c are the edge 414c having value (a) and the edge 414f having value (b). The regular expression 424 (a*b+c+) requires an edge that satisfies the condition of zero or more consecutive edges each having value (a), followed by one or more consecutive edges each having value (b). In the illustrated example, both of the edges 414c, 414f emanating from the vertex 412c satisfy this condition.

The vertex 412c may modify the received regular expression 424 (a*b+c+) if necessary. In the illustrated example, modification is not necessary and is not performed for the path including the vertex 412d; the requirement, from this point forward, remains (a*b+c+). The vertex 412c may also modify the path 428 (aa) to indicate that value (a) has been matched three times (e.g., path already collected includes (aaa)) for the path including the vertex 412d. Thus, the regular expression 424 (a*b+c+) and path 430 (aaa) are communicated to the vertex 412d.

In addition, the vertex 412c may modify the received regular expression 424 (a*b+c+) to become regular expression 432 (a*c+), wherein the requirement, from this point forward, is (a*c+) for the path including the vertex 412g and/or the edge 414f. The regular expression 432 (a*c+) takes into account that the edge 414f has value (b). At this point, a path has been found including the edge 414a having value (a), followed by the edge 414b having value (a), followed by the edge 414f having value (b). To satisfy the initial regular expression 424 (a+b+c+), from this point forward, future edges must meet the conditions of zero or more consecutive edges each having a value (b), followed by one or more edges having value (c). In addition, the vertex 412c may modify the path 428 (aa) to indicate that value (a) has been twice matched and that value (b) has been once matched (e.g., path already collected includes (aab)). Thus, the regular expression 432 (a*c+) and path 434 (aab) are communicated to the vertex 412g. In the illustrated example, the first subordinate condition (value (a)) is removed from the regular expression 424 (a*b+c+) when the next subordinate condition (value (b)) is satisfied.

The vertex 412d and the vertex 412g may process messages received in a similar fashion. Moreover, processing at the vertices 412d, 412g may proceed in parallel and/or serially, relative to each other and/or for each outgoing edge. Similarly, processing at the vertices 412e, 412h, 412j and processing at the vertices 412f, 412i, 412k may proceed in parallel and/or serially, relative to each other and/or for each outgoing edge. Eventually, three paths that satisfy all of the conditions of the initial regular expression 424 (a+b+c+) are found. Notably, the initial regular expression 422 (a+b+c+) may be satisfied at the vertex 412j, and the process may stop for storage of the data (aabbc) at a data collector. In another example, the process may continue to the vertex 412k since more and/or different data (aabbcc) may be provided that also satisfies the initial regular expression 422 (a+b+c+).

In the illustrated example, the regular expression 424 (a*b+c+) is modified to become regular expression 436 (b*c+) that is further modified to become the regular expression 440 (c*), and the path 430 (aaa) is modified to become path 438 (aaab) that is further modified to become path 442 (aaabc), which is data provided in query responses 418a, 418b. In addition, the regular expression 432 (a*c+) is modified to become regular expression 444 (c*), and the path 434 (aab) is modified to become path 446 (aabb) that is further modified to become path 448 (aabbc), which is data provided in the query response 418a. Moreover, the regular expression 432 (a*c+) is modified to become regular expression 450 (c*), and the path 434 (aab) is modified to become path 452 (aabbc) that is further modified to become path 454 (aabbcc), which is data provided in the query response 418a. Generally, processing of a graph may proceed in a depth-first manner, in a breadth-first manner, and so on.

Data satisfying the message 422 may vary based on when the message 422 is issued. For example, the query response 418a includes the data (aaabc, aabbc, aabbcc) when the message 422 is issued at a particular time, while only the data (aaabc) may be included in the query response 418b when the message 422 is issued at another time. The graph 400 may change based on a TTL of data represented by, for example, any or all of the vertices 412a-412m and/or of any or all of the edges 414a-414j. For example, any or all of the vertices 412g-412k may include a TTL having a value (1) that expires at a time interval $t_1$ to provide the query response 418b including only the data (aaabc) when the message 422 is issued at a time interval $t_2$. Similarly, any or all of the edges 414f-414j may include a TTL having a value (1) that expires at the time interval $t_1$ to provide the query response 418b including only the data (aaabc).

The graph 400 may further change based on a context for data represented by, for example, any or all of the vertices 412a-412m and/or any or all of the edges 414a-414j. In one example, a security policy may include a security rule indicating, e.g., that any or all of the vertices 412g-412k and/or any or all of the edges 414f-414j are not to be accessed when a requestor (e.g., a user, an organization, etc.) is not authorized (e.g., does not have credentials) to access the data at a particular time interval. In another example, a usage policy may include a usage rule indicating, e.g., that any or all of the vertices 412g-412k and/or any or all of the edges 414f-414j are not to be accessed when the use of respective data is mined for an impermissible purpose at a particular time interval.

In a further example, a condition policy may include a condition rule indicating, e.g., that any or all of the vertices 412g-412k and/or any or all of the edges 414f-414j are not to be accessed when a path traverses a particular component or sequence of components of the graph 410, such as a path including the link 414f, followed by the link 414g at a particular time interval. Access to data represented by any or all components of the graph 400 may vary based on any other factor. For example, factors may include a time available to process the message 422, a weight for any or all of the vertices 412a-412m and/or any or all of the edges 414a-414j, and so on.

Figure 5:
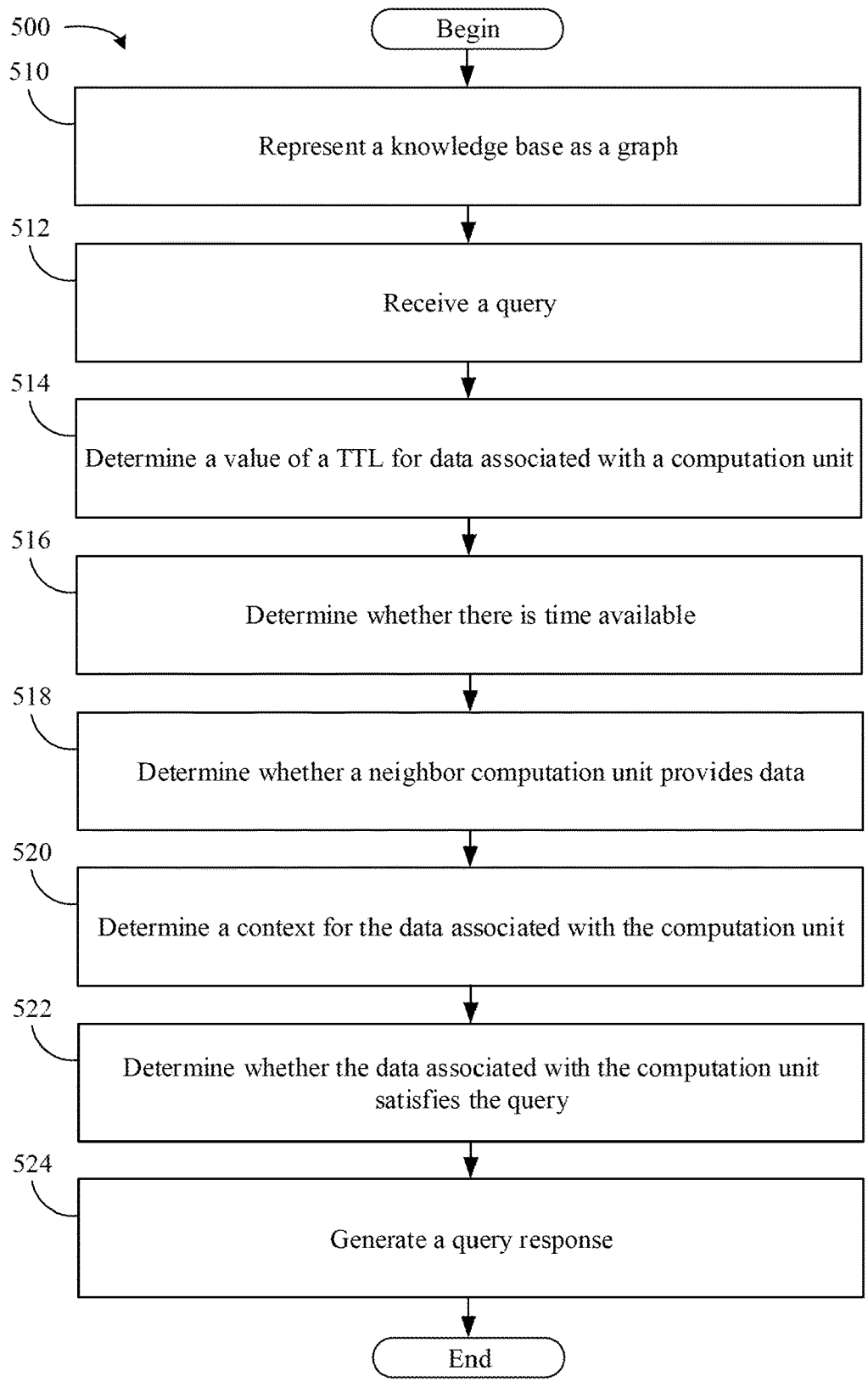
FIG. 5 is a flowchart of an example of a method to provide a query response according to an embodiment.

FIG. 5 illustrates a method 500 to provide a query response. The method 500 may generally be implemented in a computing architecture such as the apparatus 10 (FIG. 1), the computation unit 20 (FIG. 1), any or all of the computation units 112 (FIG. 2), any or all of the computation units 312 (FIG. 3), and/or any or all of the computation units 412 (FIG. 4), already discussed. More particularly, the method 500 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 500 may be written in any combination of one or more programming languages, including an object oriented programming language such as C#, JAVA or the like.

Illustrated processing block 510 represents a knowledge base as a graph including a link joining two or more computation units. The knowledge base may include, for example, social network data, geographic data, sensor data, security analysis data, and so on. The processing block 510 may generate a computation unit, may generate a link, and/or may assign (e.g., automatically, based on user input via a user interface, etc.) a property to a component of the graph. In one example, actors may represent vertices in the graph and may be individual units of computation that are isolated and independent of other actors. Actors may reside in different processes in the same machine or in difference machines.

Vertices of the graph may send and receive messages, which may be the only way the vertices can communicate and interact. The messages may include a pair that includes of a path and a regular expression. Thus, for example, if (r) is an initial regular expression and (s, p) is a message, the architecture may warrant that for every path $(p_i)$ that satisfies prefix (s), it is the case that $(p \cdot p_i)$ satisfies (r). In other words, if the architecture takes a path already matched and a path that fulfills the regular expression yet to be matched, and the paths are combined, then the architecture will determine a path that satisfies the regular expression.

Illustrated processing block 512 receives a query. In one example, the processing block 512 may evaluate a message including the query (e.g., that arrives at a vertex), may determine a path already collected by the message, may determine an entity identifier for an entity that is to issue the query, may determine a query identifier, and/or may determine the query (e.g., a regular expression). Notably, there may be a relatively large number of queries (e.g., millions of messages) flowing in a particular graph.

Illustrated processing block 514 determines a value of a time-to-live (TTL) for data associated with a computation unit. The processing block 514 may disallow access to the data when the TTL is expired. In one example, the processing block 514 may determine a value of a unit TTL for data represented by the computation unit, may determine a value of a link TTL for data represented by a link joining the computation unit and a neighbor computation unit, and/or may determine a value of a path TTL for data represented by of all computation units in a particular path and/or all links joining all computation units in the particular path.

Illustrated processing block 516 determines whether there is time available for the computation unit to process the message (e.g., the query) and/or whether there is time available for a message (e.g., a query) to arrive at a neighbor computation unit. Illustrated processing block 518 determines whether a neighbor computation unit provides data for a query response. Illustrated processing block 520 determines a context for data associated with the computation unit. For example, the processing block 520 may determine a context for data represented by the computation unit, may determine a context for data represented by a link joining the computation unit and a neighbor computation unit, and/or may determine a context for data represented by all computation units in a particular path and/or all links joining all computation units in the particular path.

Accordingly, for example, a recommendation including data (e.g., that may not be expired) which may otherwise satisfy a request for a movie suggestion in a social network graph may not be provided when a user requesting the suggestion is not a friend of a person that has "liked" a movie. In another example, a sensor output including data (e.g., that may not be expired) which may otherwise satisfy a request for usage statistics in an Internet-of-Things graph may not be provided when a use of the usage statistics is not permitted (e.g., marketing). In a further example, a route including data (e.g., that may not be expired) which may otherwise satisfy a request for a destination in a geographic graph may not be provided when a path that passes through a particular vertex representing a city is not permitted based on a condition of passing through a particular vertex representing another city (e.g., cannot go to city A via city B). In a final example, a determination of which files that a compromised computer has accessed may not be provided in a security analysis graph when a user is not authorized to access the file, when the file is to be used in a prohibited manner, and so on.

Illustrated processing block 522 determines whether the data associated with the computation unit satisfies a query. In one example, the processing block 522 may determine whether the data associated with the computation unit matches the query and/or may determine a weight value for the data associated with the computation unit. Illustrated processing block 524 generates a query response including the data associated with the computation unit that satisfies the query. In one example, the query response may include an updated message having an updated path and/or an updated query. For example, a particular vertex may modify a message to satisfy a previous invariant. Depending on a property of a particular vertex and/or of a particular outgoing edge, the particular vertex may modify a received expression and send a new message with a new regular expression and/or a new prefix path to a neighbor vertex.

In another example, the query response may be a final query response including all of the data from a path that satisfies the query. For example, a result of a query may include a final aggregation of results collected by traveling messages through a graph. It should be understood that any of the processing blocks 510-524 may be omitted, rearranged, repeated, and so on. For example, the processing block 510 may be included in the method 500 but omitted from executing at a same computing architecture as any or all of the processing blocks 512-524.

Figure 6:
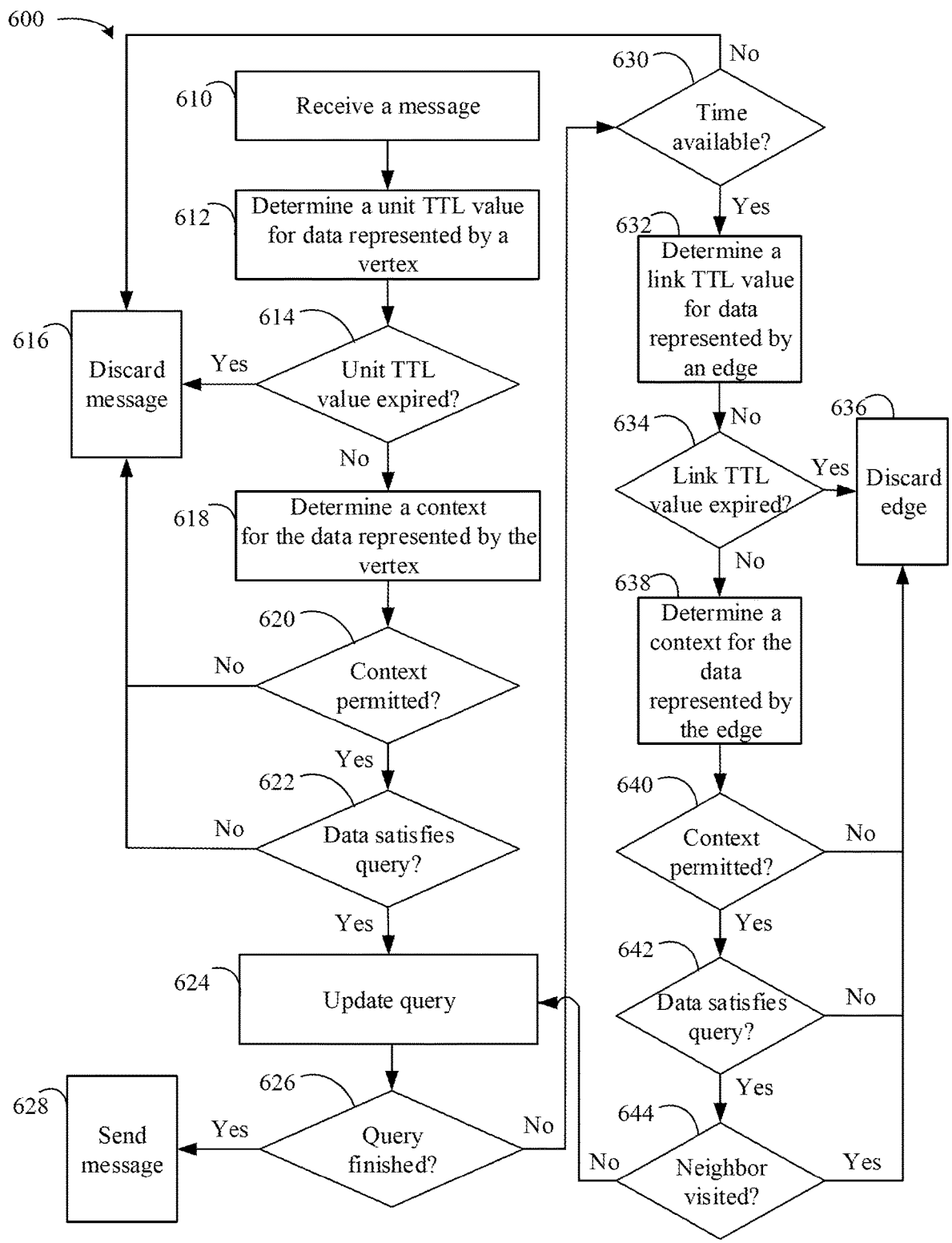
FIG. 6 is a flowchart of an example of a method to provide a query response according to an embodiment.

FIG. 6 illustrates a method 600 to provide a query response. The method 600 may generally be implemented in a computing architecture such as the apparatus 10 (FIG. 1), the computation unit 20 (FIG. 1), any or all of the computation units 112 (FIG. 2), any or all of the computation units 312 (FIG. 3), and/or any or all the computation units 412 (FIG. 4), already discussed. More particularly, the method 600 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 600 may be written in any combination of one or more programming languages, including an object oriented programming language such as C#, JAVA or the like.

Illustrated processing block 610 receives a message (e.g., at a vertex). Illustrated processing block 612 determines a value of a unit TTL for data represented by a vertex. A determination is made at block 614 whether the unit TTL is expired. If so, illustrated processing block 616 discards the message. If not, illustrated processing block 618 determines a context for the data represented by the vertex. A determination is made at block 620 whether the context is permitted. If not, the processing block 616 discards the message. If so, a determination is made at block 622 whether the data represented by the vertex satisfies a query of the message. If so, illustrated processing block 624 updates the query. If not, illustrated processing block 616 discards the message.

A determination is made at block 626 whether the query is finished. If so, illustrated processing block 628 sends a message including the data represented by the vertex to a data collector. If not, block 630 determines whether there is time available for the message (e.g., the query) to arrive at a neighbor vertex. If not, the processing block 616 discards the message. If so, illustrated processing block 632 determines a value of a link TTL for data represented by an edge joining the vertex and the neighbor vertex. A determination is made at block 634 whether the link TTL is expired. If so, illustrated processing block 636 discards the edge. If not, illustrated processing block 638 determines a context for the data associated with the edge.

A determination is made at block 640 whether the context is permitted. If not, the processing block 636 discards the edge. If so, a determination is made at block 642 whether the data represented by the edge satisfies the query. If not, the processing block 636 discards the query. If so, a determination is made at block 644 whether a neighbor has already been visited by the message (e.g., the query). If so, the processing block 636 discards the edge. If not, the processing block 624 updates the query.

A determination is made at the processing block 626 whether the query is finished. If so, the processing block 628 sends a message including the data represented by the edge (and the vertex) to the data collector. If not, the block 630 determines whether there is time available to for the message (e.g., the query) to arrive at another neighbor vertex (e.g., a plurality of outgoing edges). The operations at least between the block 630 and the block 644 may be repeated as needed. In addition, each vertex of a graph may execute serially and/or execute in parallel the operations between the blocks 610 and 644. Moreover, any of processing blocks may be omitted, rearranged, and so on.

Figure 7:
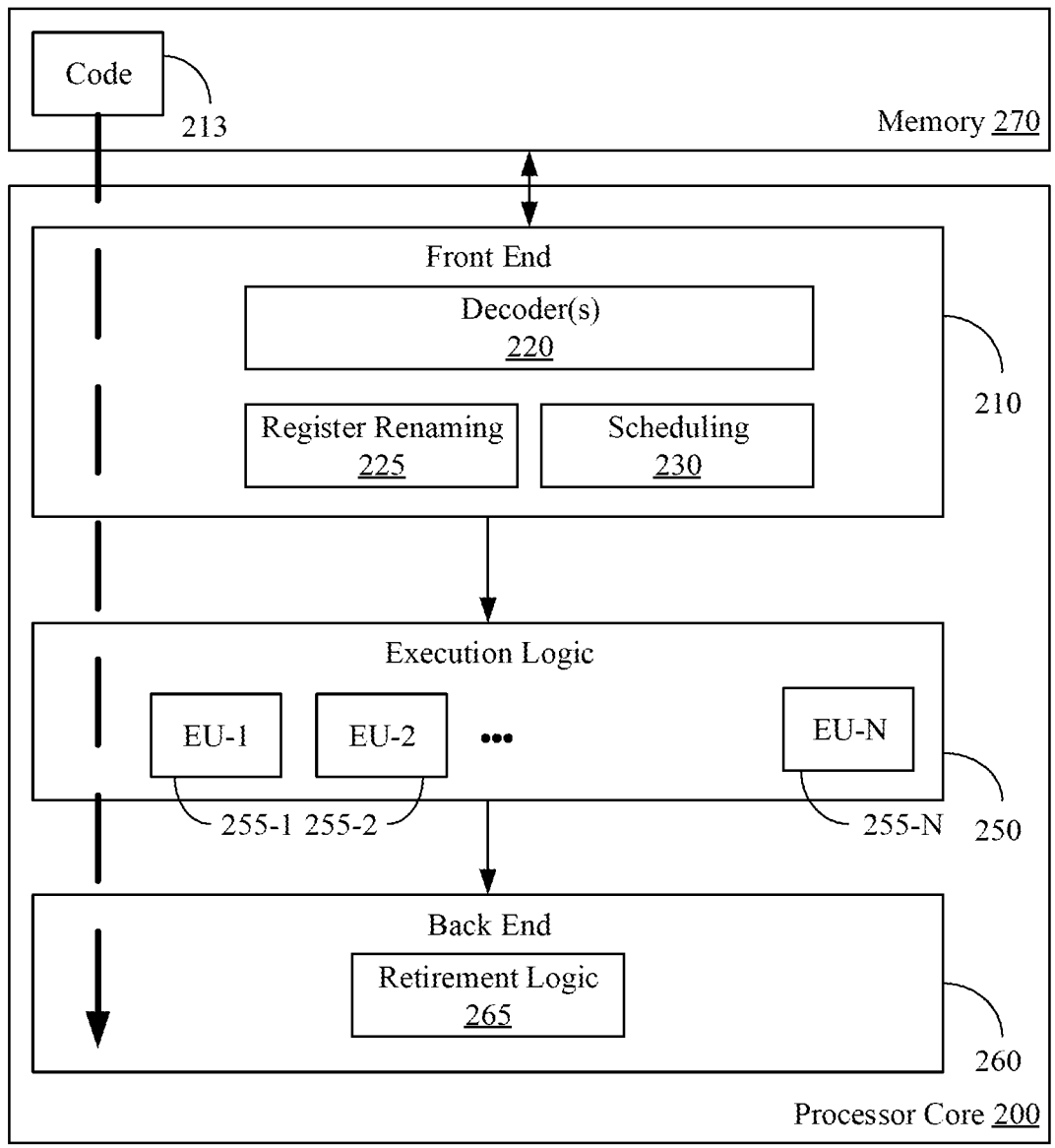
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 500 (FIG. 5) and/or the method 600 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
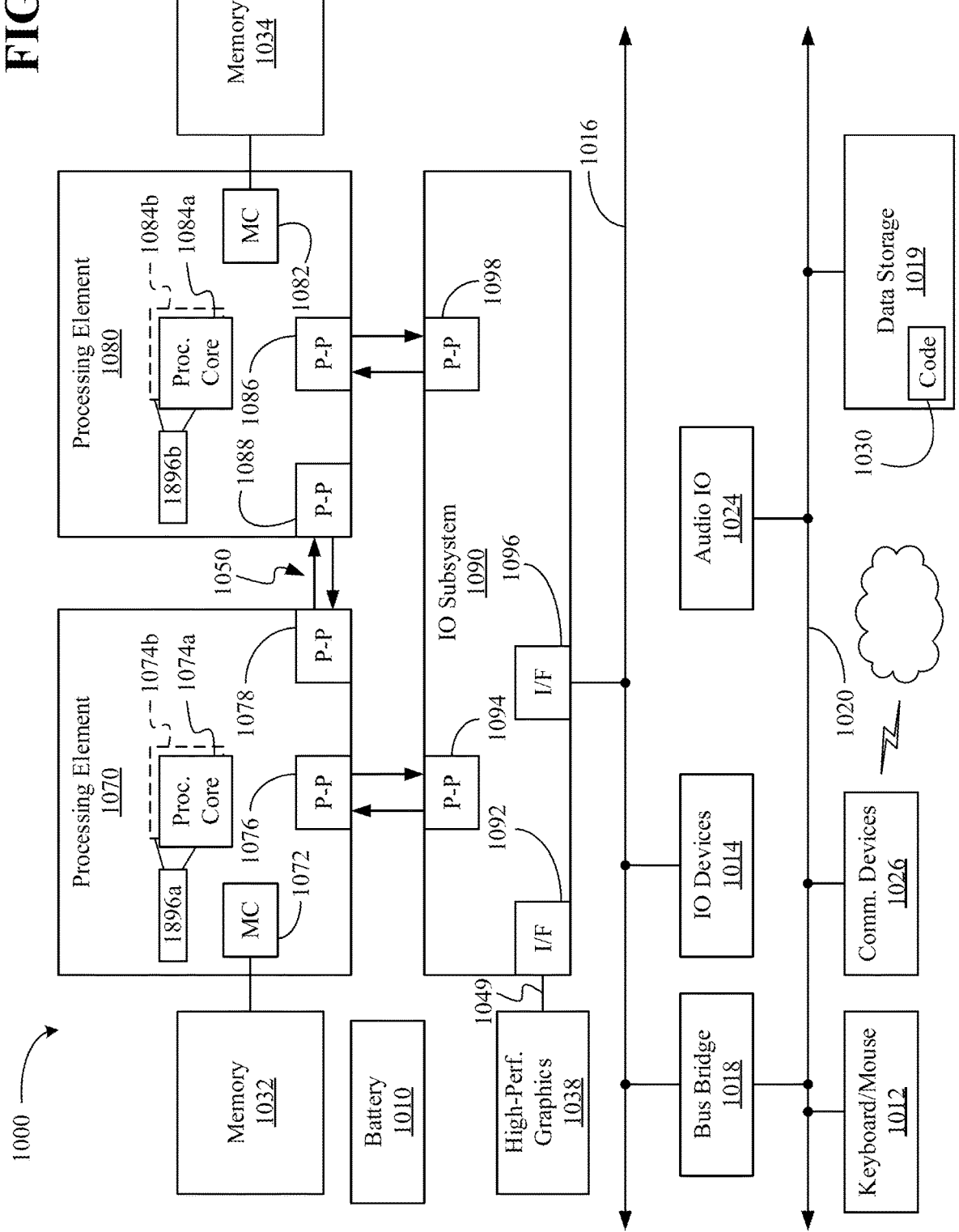
FIG. 8 is a block diagram of an example of a system according to an embodiment.

Referring now to FIG. 8, shown is a block diagram of a system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 500 (FIG. 5) and/or the method 600 (FIG. 6), already discussed, and may be similar to the code 213 (FIG. 7), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8. Moreover, the network controllers/communication device(s) 1026 may be implemented as a HFI (host fabric interface), also known as NIC (network interface card), that is integrated with one or more of the processing elements 1070, 1080 either on the same die, or in the same package.

ADDITIONAL NOTES AND EXAMPLES

Example 1 may include a system to provide a query response, comprising an interface to provide data satisfying a query to a data collector, and/or a computation unit comprising a message analyzer to evaluate a message including a query that is to arrive at the computation unit, a time analyzer to determine a value of a time-to-live (TTL) for data associated with the computation unit, wherein the computation unit is to disallow access to the data when the TTL is expired, a content analyzer to determine whether the data associated with the computation unit satisfies a query, and/or a response generator to generate a query response including the data associated with the computation unit that satisfies the query.

Example 2 may include the system of Example 1, wherein the message analyzer is to include a path evaluator to determine a path already collected by the message, an entity evaluator to determine an entity identifier for an entity that is to issue the query, and/or a query evaluator to determine one or more of a query identifier and/or a query, wherein the query is to include a regular expression.

Example 3 may include the system of any one of Examples 1 to 2, wherein the time analyzer is to include an available time evaluator to determine whether there is time available for one or more of the computation unit to process the query and/or a message to arrive at a neighbor computation unit, a unit TTL evaluator to determine a value of a unit TTL for data represented by the computation unit, a link TTL evaluator to determine a value of a link TTL for data represented by a link joining the computation unit and a neighbor computation unit, and/or a path TTL evaluator to determine a value of a path TTL for data represented by one or more of all computation units in a particular path and/or all links joining all computation units in the particular path.

Example 4 may include the system of any one of Examples 1 to 3, further including a context analyzer comprising a unit context evaluator to determine a context for the data represented by the computation unit, a link context evaluator to determine a context for data represented by a link joining the computation unit and a neighbor computation unit, and/or a path context evaluator to determine a context for data represented by one or more of all computation units in a particular path and/or all links joining all computation units in a particular path.

Example 5 may include the system of any one of Examples 1 to 4, wherein the content analyzer further includes a data matcher to determine whether the data associated with the computation unit matches the query, and/or a weight analyzer to determine a weight value for the data associated with the computation unit.

Example 6 may include the system of any one of Examples 1 to 5, further including a neighbor analyzer to determine whether a neighbor computation unit is to provide data for the query response, wherein the computation unit is to disallow access to a link joining the computation unit with the neighbor computation unit when the neighbor computation unit provides data for the query response.

Example 7 may include the system of any one of Examples 1 to 6, further including a data modeler to represent a knowledge base as a graph including a link joining two or more computation units, wherein each of the two or more computation units in the graph is to compute independently.

Example 8 may include an apparatus to provide a query response, comprising a time analyzer to determine a value of a time-to-live (TTL) for data associated with a computation unit, wherein the computation unit is to disallow access to the data when the TTL is expired, a content analyzer to determine whether the data associated with the computation unit satisfies a query, and/or a response generator to generate a query response including the data associated with the computation unit that satisfies the query.

Example 9 may include the apparatus of Example 8, further including a message analyzer to evaluate a message including the query that is to arrive at the computation unit, wherein the message analyzer is to include a path evaluator to determine a path already collected by the message, an entity evaluator to determine an entity identifier for an entity that is to issue the query, and/or a query evaluator to determine one or more of a query identifier and/or a query.

Example 10 may include the apparatus of any one of Examples 8 to 9, wherein the time analyzer is to include an available time evaluator to determine whether there is time available for one or more of the computation unit to process the query and/or a message to arrive at a neighbor computation unit.

Example 11 may include the apparatus of any one of Examples 8 to 10, wherein the time analyzer is to include a unit TTL evaluator to determine a value of a unit TTL for data represented by the computation unit, a link TTL evaluator to determine a value of a link TTL for data represented by a link joining the computation unit and a neighbor computation unit, and/or a path TTL evaluator to determine a value of a path TTL for data represented by one or more of all computation units in a particular path and/or all links joining all computation units in the particular path.

Example 12 may include the apparatus of any one of Examples 8 to 11, further including a context analyzer comprising a unit context evaluator to determine a context for the data represented by the computation unit, a link context evaluator to determine a context for data represented by a link joining the computation unit and a neighbor computation unit, and/or a path context evaluator to determine a context for data represented by of all computation units in a particular path and/or all links joining all computation units in a particular path.

Example 13 may include the apparatus of any one of Examples 8 to 12, wherein the content analyzer further includes a data matcher to determine whether the data associated with the computation unit matches the query, and/or a weight analyzer to determine a weight value for the data associated with the computation unit.

Example 14 may include the apparatus of any one of Examples 8 to 13, further including a neighbor analyzer to determine whether a neighbor computation unit is to provide data for the query response.

Example 15 may include the apparatus of any one of Examples 8 to 14, further including a data modeler to represent a knowledge base as a graph including a link joining two or more computation units.

Example 16 may include a method to provide a query response, comprising determining a value of a time-to-live (TTL) for data associated with a computation unit, wherein the computation unit disallows access to the data when the TTL is expired, determining whether the data associated with the computation unit satisfies a query, and/or generating a query response including the data associated with the computation unit that satisfies the query.

Example 17 may include the method of Example 16, further including evaluating a message including the query that arrives at the computation unit, determining a path already collected by the message, determining an entity identifier for an entity that issues the query, and/or determining one or more of a query identifier and/or a query.

Example 18 may include the method of any one of Examples 16 to 17, further including determining whether there is time available for the computation unit to process the query, and/or determining whether there is time available for a message to arrive at a neighbor computation unit.

Example 19 may include the method of any one of Examples 16 to 18, further including determining a value of a unit TTL for data represented by the computation unit, determining a value of a link TTL for data represented by a link joining the computation unit and a neighbor computation unit, and/or determining a value of a path TTL for data represented by one or more of all computation units in a particular path and/or all links joining all computation units in the particular path.

Example 20 may include the method of any one of Examples 16 to 19, further including determining a context for the data represented by the computation unit, determining a context for data represented by a link joining the computation unit and a neighbor computation unit, and/or determining a context for data represented by one or more of all computation units in a particular path and/or all links joining all computation units in a particular path.

Example 21 may include the method of any one of Examples 16 to 20, further including determining whether the data associated with the computation unit matches the query, and/or determining a weight value for the data associated with the computation unit.

Example 22 may include the method of any one of Examples 16 to 21, further including determining whether a neighbor computation unit provides data for the query response.

Example 23 may include the method of any one of Examples 16 to 22, further including representing a knowledge base as a graph including a link joining two or more computation units.

Example 24 may include least one computer readable storage medium comprising a set of instructions which, when executed by a device, cause the device to determine a value of a time-to-live (TTL) for data associated with a computation unit, wherein the computation unit is to disallow access to the data when the TTL is expired, determine whether the data associated with the computation unit satisfies a query, and/or generate a query response including the data associated with the computation unit that satisfies the query.

Example 25 may include the at least one computer readable storage medium of Example 24, wherein the instructions, when executed, cause a device to evaluate a message including the query that is to arrive at the computation unit, determine a path already collected by the message, determine an entity identifier for an entity that is to issue the query, and/or determine one or more of a query identifier and/or a query.

Example 26 may include the at least one computer readable storage medium of any one of Examples 24 to 25, wherein the instructions, when executed, cause a device to determine whether there is time available for the computation unit to process the query, and/or determine whether there is time available for a message to arrive at a neighbor computation unit.

Example 27 may include the at least one computer readable storage medium of any one of Examples 24 to 26, wherein the instructions, when executed, cause a device to determine a value of a unit TTL for data represented by the computation unit, determine a value of a link TTL for data represented by a link joining the computation unit and a neighbor computation unit, and/or determine a value of a path TTL for data represented by one or more of all computation units in a particular path and/or all links joining all computation units in the particular path.

Example 28 may include the at least one computer readable storage medium of any one of Examples 24 to 27, wherein the instructions, when executed, cause a device to determine a context for the data represented by the computation unit, determine a context for data represented by a link joining the computation unit and a neighbor computation unit, and/or determine a context for data represented by one or more of all computation units in a particular path and/or all links joining all computation units in a particular path.

Example 29 may include the at least one computer readable storage medium of any one of Examples 24 to 28, wherein the instructions, when executed, cause a device to determine whether the data associated with the computation unit matches the query, and/or determine a weight value for the data associated with the computation unit.

Example 30 may include the at least one computer readable storage medium of any one of Examples 24 to 29, wherein the instructions, when executed, cause a device to determine whether a neighbor computation unit is to provide data for the query response.

Example 31 may include the at least one computer readable storage medium of any one of Examples 24 to 30, wherein the instructions, when executed, cause a device to represent a knowledge base as a graph including a link joining two or more computation units.

Example 32 may include an apparatus to provide a query response, comprising means for determining a value of a time-to-live (TTL) for data associated with a computation unit, wherein the computation unit is to disallow access to the data when the TTL is expired, means for determining whether the data associated with the computation unit satisfies a query, and/or means for generating a query response including the data associated with the computation unit that satisfies the query.

Example 33 may include the apparatus of Example 32, further including means for evaluating a message including the query that is to arrive at the computation unit, means for determining a path already collected by the message, means for determining an entity identifier for an entity that is to issue the query, and/or means for determining one or more of a query identifier and/or a query.

Example 34 may include the apparatus of any one of Examples 32 to 33, further including means for determining whether there is time available for the computation unit to process the query, and/or means for determine whether there is time available for a message to arrive at a neighbor computation unit.

Example 35 may include the apparatus of any one of Examples 32 to 34, further including means for determining a value of a unit TTL for data represented by the computation unit, means for determining a value of a link TTL for data represented by a link joining the computation unit and a neighbor computation unit, and/or means for determining a value of a path TTL for data represented by one or more of all computation units in a particular path and/or all links joining all computation units in the particular path.

Example 36 may include the apparatus of any one of Examples 32 to 35, further including means for determining a context for the data represented by the computation unit, means for determining a context for data represented by a link joining the computation unit and a neighbor computation unit, and/or means for determining a context for data represented by one or more of all computation units in a particular path and/or all links joining all computation units in a particular path.

Example 37 may include the apparatus of any one of Examples 32 to 36, further including means for determining whether the data associated with the computation unit matches the query, and/or means for determining a weight value for the data associated with the computation unit.

Example 38 may include the apparatus of any one of Examples 32 to 37, further including means for determining whether a neighbor computation unit is to provide data for the query response.

Example 39 may include the apparatus of any one of Examples 32 to 38, further including means for representing a knowledge base as a graph including a link joining two or more computation units.

Thus, techniques described herein may provide a query response based on ephemeral data. In one example, a query response may be based on contextual ephemeral data. As a result, a graph may be utilized to provide efficient resource utilization to provide a query response. For example, a vertex in a graph may be stateless and its location may be transparent to another vertex in the graph to provide scalability while concurrently computing a query response and handling ephemeral data. Indeed, techniques described herein may provide a decentralized architecture to handle timestamps and the management of data. Moreover, techniques described herein may account for context, such that access to the data may not solely be based on a timestamp.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A system comprising:
    a first computation unit, implemented at least partly as one or more of configurable logic hardware or fixed functionality logic hardware, that is to have access only to first data represented by the first computation unit and respective link data represented by each respective link joining the first computation unit and a respective neighboring computation unit, wherein the first computation unit comprises:
        a message analyzer to evaluate a message including an electronic query that is to arrive at the first computation unit;
        a time analyzer to determine a value of a first time-to-live (TTL) for the first data and a value of a second TTL for second data represented by a first link joining the first computation unit and a first neighboring computation unit, wherein the first computation unit is to disallow access to the first data when the first TTL is expired, and disallow access to the first link when the second TTL is expired;
        a content analyzer to determine whether the first data satisfies the electronic query and whether the second data satisfies the electronic query;
        a response generator to generate an electronic query response including the first data and the second data when the first data and the second data satisfy the electronic query and are not expired; and
        an interface to provide the query response to the first neighboring computation unit via the first link.

2. The system of claim 1, wherein the message analyzer is to include:
    a path evaluator to determine a path already collected by the message;
    an entity evaluator to determine an entity identifier for an entity that is to issue the electronic query; and
    a query evaluator to determine one or more of a query identifier or the electronic query, wherein the electronic query is to include a regular expression.

3. The system of claim 1, wherein the time analyzer is to include:
    an available time evaluator to determine whether there is time available for one or more of the first computation unit to process the electronic query or an updated message to arrive at the first neighboring computation unit;
    a unit TTL evaluator to determine the value of the first TTL;
    a link TTL evaluator to determine the value of the second TTL; and
    a path TTL evaluator to determine a value of a path TTL for all data represented by one or more of all computation units in a particular path that satisfies the electronic query or all links joining all computation units in the particular path that satisfies the electronic query.

4. The system of claim 1, further including a context analyzer comprising:
    a unit context evaluator to determine a context for the first data;
    a link context evaluator to determine a context for the second data; and
    a path context evaluator to determine a context for all data represented by one or more of all computation units in a particular path that satisfies the electronic query or all links joining all computation units in the particular path that satisfies the electronic query.

5. The system of claim 1, wherein the content analyzer further includes:
    a data matcher to determine whether the first data matches the electronic query; and
    a weight analyzer to determine a weight value for the first data.

6. The system of claim 1, further including a neighbor analyzer to determine whether the first neighboring computation unit is to provide data associated with the first neighboring computation unit for the electronic query response, wherein the first computation unit is to disallow access to the first link when the first neighboring computation unit provides the data associated with the first neighboring computation unit for the electronic query response.

7. The system of claim 1, further including a data modeler to represent a knowledge base as a graph including the first link, wherein each of the first computation unit and the first neighboring computation unit in the graph are to compute independently, and wherein the first computation unit is to load the first data from local memory and is to load the second data from the local memory.

8. An apparatus comprising:
a first computation unit, implemented at least partly as one or more of configurable logic hardware or fixed functionality logic hardware, that is to have access only to first data represented by the first computation unit and respective link data represented by each respective link joining the first computation unit and a respective neighboring computation unit, wherein the first computation unit comprises:
a time analyzer to determine a value of a first time-to-live (TTL) for the first data and a value of a second TTL for second data represented by a first link joining the first computation unit and a first neighboring computation unit, wherein the first computation unit is to disallow access to the first data when the first TTL is expired, and disallow access to the first link when the second TTL is expired;
a content analyzer to determine whether the first data satisfies an electronic query and whether the second data satisfies the electronic query;
a response generator to generate an electronic query response including the first data and the second data when the first data and the second data satisfy the electronic query and are not expired; and
provide the electronic query response to the first neighboring computation unit via the first link.

9. The apparatus of claim 8, further including a message analyzer to evaluate a message including the electronic query that is to arrive at the first computation unit, wherein the message analyzer is to include one or more of:
a path evaluator to determine a path already collected by the message;
an entity evaluator to determine an entity identifier for an entity that is to issue the electronic query; or
a query evaluator to determine one or more of a query identifier or the electronic query.

10. The apparatus of claim 8, wherein the time analyzer is to include an available time evaluator to determine whether there is time available for one or more of the first computation unit to process the electronic query or an updated message to arrive at the first neighboring computation unit.

11. The apparatus of claim 8, wherein the time analyzer is to include one or more of:
a unit TTL evaluator to determine the value of the first TTL;
a link TTL evaluator to determine the value of the second TTL; or
a path TTL evaluator to determine a value of a path TTL for all data represented by one or more of all computation units in a particular path that satisfies the electronic query or all links joining all computation units in the particular path that satisfies the electronic query.

12. The apparatus of claim 8, further including a context analyzer comprising one or more of:
a unit context evaluator to determine a context for the first data;
a link context evaluator to determine a context for the second data; or
a path context evaluator to determine a context for all data represented by one or more of all computation units in a particular path that satisfies the electronic query or all links joining all computation units in the particular path that satisfies the electronic query.

13. The apparatus of claim 8, wherein the content analyzer further includes one or more of:
a data matcher to determine whether the first data matches the electronic query; or
a weight analyzer to determine a weight value for the first data.

14. The apparatus of claim 8, further including a neighbor analyzer to determine whether the first neighboring computation unit is to provide data associated with the first neighboring computation unit for the electronic query response.

15. The apparatus of claim 8, further including a data modeler to represent a knowledge base as a graph including the first link, wherein the first computation unit is to load the first data from local memory and is to load the second data from the local memory.

16. A method comprising:
determining, with a first computation unit, a value of a first time-to-live (TTL) for first data represented by the first computation unit and a value of a second TTL for second data represented by a first link joining the first computation unit and a first neighboring computation unit, wherein the first computation unit has access only to the first data and respective link data represented by each respective link joining the first computation unit and a respective neighboring computation unit, and wherein the first computation unit disallows access to the first data when the first TTL is expired and disallows access to the first link when the second TTL is expired;
determining, with the first computation unit, that the first data satisfies an electronic query;
determining, with the first computation unit, that the second data satisfies the electronic query;
generating, with the first computation unit, an electronic query response including the first data and the second data in response to the first data and the second data satisfying the electronic query and not being expired; and
providing, with the first computation unit, the electronic query response to the first neighboring computation unit via the first link.

17. The method of claim 16, further including one or more of:
determining whether there is time available for the first computation unit to process the electronic query; or
determining whether there is time available for an updated message to arrive at the first neighboring computation unit.

18. The method of claim 16, further including one or more of:
determining the value of the first TTL;
determining the value of the second TTL; or
determining a value of a path TTL for all data represented by one or more of all computation units in a particular path that satisfies the electronic query or all links joining all computation units in the particular path that satisfies the electronic query.

19. The method of claim 16, further including one or more of:
determining a context for the first data;
determining a context for the second data; or
determining a context for all data represented by one or more of all computation units in a particular path that satisfies the electronic query or all links joining all computation units in the particular path that satisfies the electronic query.

20. At least one non-transitory computer readable storage medium comprising a set of instructions which, when executed by a device, cause the device to:
- determine, with a first computation unit, a value of a first time-to-live (TTL) for first data represented by the first computation unit and a value of a second TTL for second data represented by a first link joining the first computation unit and a first neighboring computation unit, wherein the first computation unit is to have access only to the first data and respective link data represented by each respective link joining the first computation unit and a respective neighboring computation unit, and wherein the first computation unit is to disallow access to the first data when the first TTL is expired and disallows access to the first link when the second TTL is expired;
- determine, with the first computation unit, whether the first data satisfies an electronic query;
- determine, with the first computation unit, whether the second data satisfies the electronic query;
- generate, with the first computation unit, an electronic query response including the first data and the second data when the first data and the second data satisfy the electronic query and are not expired; and
- provide, with the first computation unit, the electronic query response to the first neighboring computation unit via the first link.

21. The at least one non-transitory computer readable storage medium of claim 20, wherein the instructions, when executed, cause a device to one or more of:
- determine whether there is time available for the first computation unit to process the electronic query; or
- determine whether there is time available for an updated message to arrive at the first neighboring computation unit.

22. The at least one non-transitory computer readable storage medium of claim 20, wherein the instructions, when executed, cause a device to one or more of:
- determine the value of the first TTL;
- determine the value of the second TTL; or
- determine a value of a path TTL for all data represented by one or more of all computation units in a particular path that satisfies the electronic query or all links joining all computation units in the particular path that satisfies the electronic query.

23. The at least one non-transitory computer readable storage medium of claim 20, wherein the instructions, when executed, cause a device to one or more of:
- determine a context for the first data;
- determine a context for the second data; or
- determine a context for all data represented by one or more of all computation units in a particular path that satisfies the electronic query or all links joining all computation units in the particular path that satisfies the electronic query.

24. The at least one non-transitory computer readable storage medium of claim 20, wherein the instructions, when executed, cause a device to one or more of:
- determine whether the first data matches the electronic query; or
- determine a weight value for the first data.

25. The at least one non-transitory computer readable storage medium of claim 20, wherein the instructions, when executed, cause a device to determine whether the first neighboring computation unit is to provide data associated with the first neighboring computation unit for the electronic query response.

* * * * *